No. 618,730.
J. REIBEL.
ACETYLENE GAS GENERATOR.
(Application filed Dec. 22, 1897.)
Patented Jan. 31, 1899.
(No Model.)
2 Sheets—Sheet 1.
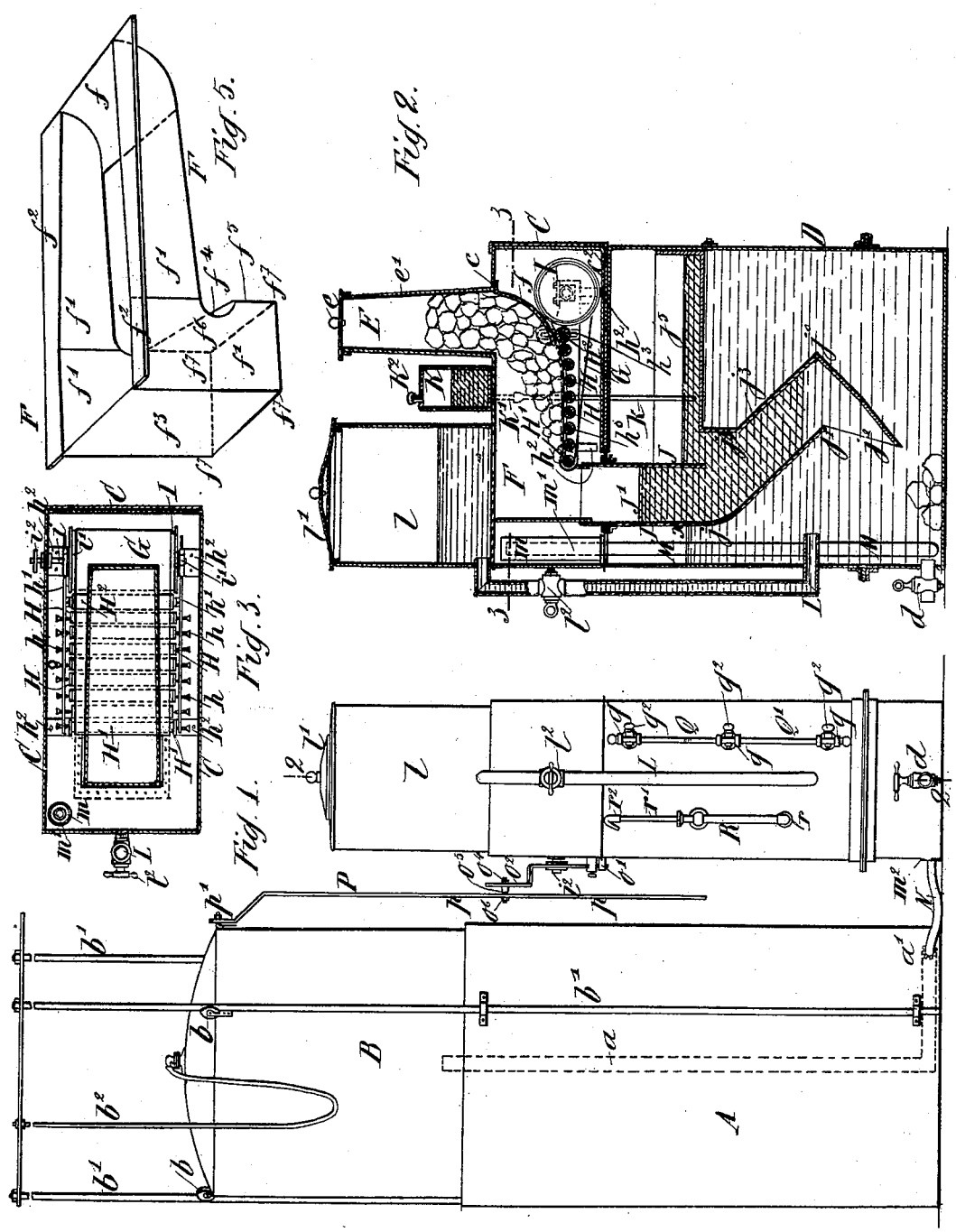

No. 618,730. Patented Jan. 31, 1899.
J. REIBEL.
ACETYLENE GAS GENERATOR.
(Application filed Dec. 22, 1897.)
(No Model.) 2 Sheets—Sheet 2.
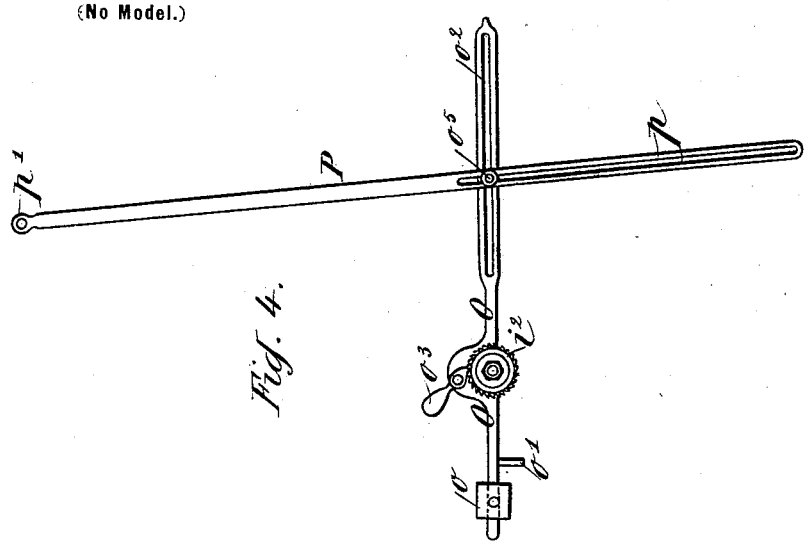
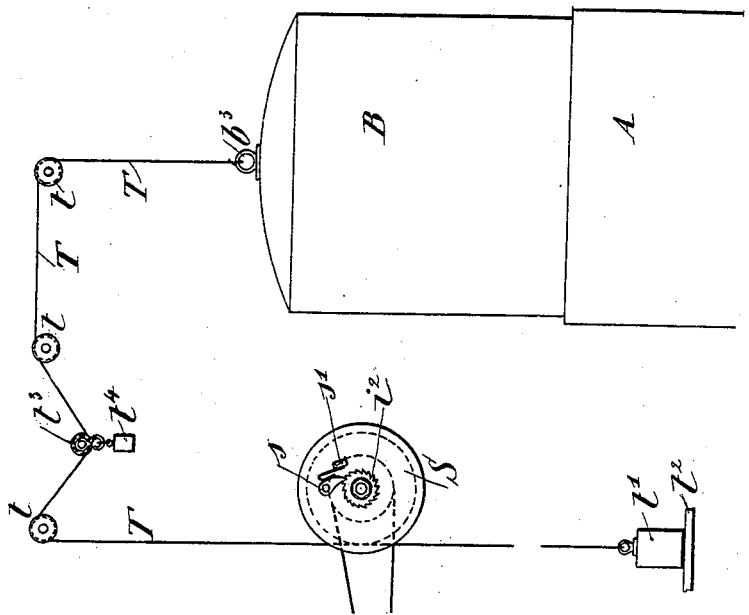
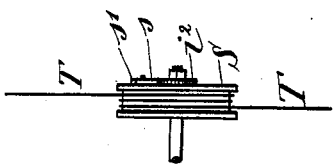
WITNESSES:
Inventor:
J. Reibel
By Munn
Attorneys.

UNITED STATES PATENT OFFICE.

JEAN REIBEL, OF ANGOULÊME, FRANCE.

ACETYLENE-GAS GENERATOR.

SPECIFICATION forming part of Letters Patent No. 618,730, dated January 31, 1899.

Application filed December 22, 1897. Serial No. 663,033. (No model.)

*To all whom it may concern:*

Be it known that I, JEAN REIBEL, a citizen of the Republic of France, residing at 24 Rue de Lavalette, Angoulême, France, have invented certain Improvements in Apparatus for Generating Acetylene Gas, (for which I have obtained a French patent, dated May 14, 1897, No. 266,946,) of which the following is a specification.

This invention relates to an apparatus for producing or generating acetylene gas and one which automatically produces the gas according to the supply needed by the fall of fragments of calcium or other suitable carbid into a vessel of water.

The following description refers to the annexed drawings, upon which—

Figure 1 shows an apparatus in elevation, including the gazogene and the gasometer. Fig. 2 is a section of the gazogene on line 2 2 of Fig. 1. Fig. 3 is a section of the gazogene on line 3 3 of Fig. 2, the carbid being removed, showing in plan the distributer apparatus. Fig. 4 is a detail view of the pawl-and-ratchet device for operating the distributer apparatus. Fig. 5 is a perspective view of the tray holding the carbid and of the distributer. Fig. 6 is a diagram of an alternative device for regulating the generation of the gas. Fig. 7 is an elevation of the pulley used in this arrangement.

This gas-generator consists of two parts—the gasometer and the gazogene—which may be arranged side by side.

The gasometer is not of special construction, but is placed by the side of the gazogene only to be able to control the distributing apparatus by means of the bell of the gas-holder or gasometer, as will be seen later.

The gasometer is composed of a tank A, containing water, in which tank is arranged a bell or holder B, furnished with roller $b$, traveling on rods or guides $b'$, attached to the walls of the tank A, the bell or holder being thus guided in its vertical movement. To the upper part of the holder is secured a rubber tube $b^2$, serving to conduct the gas out of the holder. A tube $a$ rises from the bottom of the tank A and is continued above the level of the water to within the holder B. This tube at $a'$ passes through the wall of the tank A for the purpose of conducting the gas from the gazogene into the holder.

The gazogene is formed of a receiver C, inclosing the distributing arrangement, which allows fragments of calcium carbid to fall in variable quantities and according to the consumption of gas into the water contained in a second tank D. The fragments of calcium carbid are contained in a bottomless reservoir E, ordinarily square or rectangular, whereof the section is enlarged toward the base. At its upper part it is closed by a cover $e$, and at the lower part its opening corresponds to an opening in the upper wall $c$ of the receiver C. One of the walls $e'$ of the reservoir E registers with or meets the upper end of a curved plate $f$, arranged within the receiver C. This plate $f$ forms part of the tray F. (Shown in detail on Fig. 5.) It consists of two side plates $f' f'$, bent back to form two flanges $f^2 f^2$, by which the plate is secured to the wall $c$ of the receiver C within this latter in such a manner that the curved plate $f$ registers with the wall $e'$ of reservoir E. The two side plates $f' f'$ are joined or connected at their ends by a wall $f^3$. The lower edge of the plates $f' f'$ meets the side edge of the curved plate $f$ and extends downward from the end of the flanges $f^2$, then is curved out to $f^4$, and is afterward carried down vertically to $f^5$. The vertical edges $f^5$ are joined by a wall $f^6$, parallel to the wall $f^3$, which thus forms a chimney, the section of which is shown as $f^7 f^7$. It will thus be remarked that the walls $f' f'$ are not exactly parallel, but that they spread apart from each end toward the vertical edges $f^5$. The widened shapes of the reservoir E and of the part F are so made to allow the lumps of calcium carbid to fall freely from the hopper E into the tray F.

The space between the curved plate $f$ and the vertical wall $f^6$ of the chimney is filled by part of an endless band G, arranged underneath the tray. This band or strap G in the part which closes the space between the curved bottom $f$ and the vertical wall $f^6$ is supported by small rollers H, perpendicular to the sides of the band and turning on axes $h$, adjusted in two parallel frames $h'$, held by supports $h^2$, fixed to the bottom $c^2$ of the receiver C. The end roller H' at the chimney side partly fits into the recess $f^4$, and the roller at the opposite end serves as a tension-roller. Its axis is mounted on pivots $h$, arranged in vertical guides $h^3$ on the supports $h'$. This roller (marked H$^2$) is arranged under the edge of the plate $f$, and the belt G passes under it. The band G passes over and puts in motion a drum I, which is rotatable on an axle $i$, journaled in the frames or supports $h'$. The axis $i$ passes through a side wall of the receiver C, and a ratchet-wheel $i^2$ is keyed to an extension of the same. The chimney $f^7$ fits into a channel J, of slightly-larger section, which passes through the wall separating the receiver C and tank D and enters this latter, the channel J thus affording the only communication between the two parts C and D. The channel J descends vertically to $j$, then is inclined to $j'$, and afterward is inclined in the opposite direction to discharge at $j^2$ into the midst of the water contained in D. At a point just below the level $x$ of the water the wall of channel J in the slanting portion $j^3$ and on the side of the interior of the angle formed in the channel is situated an opening $j^4$, by which the channel J communicates with a small chamber $j^5$, which is open at top, thereby communicating with the air of the receiver D. This chamber $j^5$, as well as the vertical part J' and the inclined portion J$^2$ of the channel J, contains a certain qantity of petroleum or of a liquid of a density less than that of water, and which, as well as its vapors, is without action on calcium carbid. This column of petroleum (represented on the drawings by cross-hatching) extends to a point $j$, so that the bubbles of gas arising from the water underneath cannot enter the vertical part J' of the channel J and for the most part escape by the opening $j^2$. Those which do not come out by that part then escape by the opening $j^4$, cross the layer of petroleum under the chamber $j^5$ and reach the receiver D. The petroleum or other liquid for the same purpose is introduced into the chamber $j^5$ by a tube $k$, fed by a tube K', fixed to the bottom of a petroleum-reservoir K, placed on the upper face of the case C. This reservoir can be closed by a plug or stopper $k^2$. Water can be introduced into the tank D by a tube L, leading from a reservoir $l$, fitted with a lid $l'$ and placed on the upper part of the receiver or case C, the tube L being furnished with a cock $l^2$ to regulate the flow of water. The gas escapes from the tank D by a tube M, which at its upper extremity $m$ enters a cylinder $m'$, fixed to the partition between C and D, opening into this latter, but not communicating with C. This cylinder acts as a pocket or small chamber into which the tube M leads. This latter descends into the tank D through the water therein contained and passes out through this receptacle at $m^2$. It is joined to the tube $a$, which is continued through the case of the tank A at $a'$ by means of a tube N. The water in the receptacle D, as well as the residues of the reaction, can be discharged through a cock $d$.

The drum I, around which the endless band G passes, is operated in the following manner: On its axis $i$, between the wall of the receptacle C and the ratchet-wheel $i^2$, is mounted a lever O, whose end is fitted with a counterpoise $o$, tending to support it at this end on a support $o'$. The other end of the lever is formed into a link $o^2$, and on this part of the lever adjoining the ratchet-wheel $i^2$ is arranged a pawl $o^3$. On the link $o^2$ is fixed by a bolt $o^4$ a pivot $o^5$, which is adjustable within a link $p$, forming part of a rod P, jointed at $p'$ to the upper casing of the bell-holder B. The rod P being rather long and consequently somewhat flexible, a nut $o^6$, fixed to the pivot $o^5$, prevents it from disengagement with the link $p$. A double-gage glass Q Q', formed of glass tube incased in metal mountings $q$ $q$, allows the level of separation of the water and the petroleum in the channel J to be shown in one half Q' and the level of water in receptacle D to be shown in the other half Q. This double level may be furnished with cocks $q^2$. An overflow arrangement is adapted to the tank D. A tube R communicates with the receptacle D at a point $r$, which ought always to be above the level of the water. Another tube $r'$, terminated by a bend $r^2$, can slide in the tube R. By the help of this arrangement the water in the receptacle D escapes when it reaches the level of the curved beak $r'$. This arrangement can be employed to obtain a continuous current of water in the apparatus, the water being fed in by tube L.

The working of the gas-producer apparatus above described is as follows: Supposing the bell-holder B to already contain a certain quantity of gas, as soon as this bell falls on consumption of gas the rod P descends with it, being put in motion by the pivot $o^5$, lever O makes it oscillate on its axis $i$, the pawl $o^3$ acts on the ratchet-wheel $i^2$, draws it, and the drum I turns for a certain space, causing travel of the endless band G. This causes the lumps of carbid to fall down, and a number of these fall into the channel J and into the water in the receptacle D, and acetylene gas is produced, bubbles rising from the liquid and uniting in the upper part of the receptacle D, the gas enters the pocket $m$, and thence by the tubes M, N, and $a$ is conducted to the bell-holder B, and this latter rises, resuming its position. The above is repeated after a fresh descent by the bell-holder, and so on.

The course of the lever O is limited by the support $o'$, as we have seen above, and according to the position of this support $o'$ the rotation of the cylinder I, and consequently the fall of the fragments of carbid, can be fixed for any desired point in the fall of the bell-holder.

By changing the position of the pivot $o^4$ in the slide $o^2$ a larger or smaller movement of the lever-arm is obtained, and consequently the amount of rotation of the cylinder I can be varied.

The column of petroleum contained in the channel J serves as a passage for the lumps of carbid as long as they have not reached a point at which the bubbles of gas produced are prevented from reaching the upper part J' of this channel, and thence likely to attain the reserve of carbid. Any bubbles accidentally rising up the channel J escape by the opening $j^4$ and, passing through the layer of petroleum in the chamber $j^5$, join the gas in the receptacle D.

As shown on Figs. 6 and 7, there is another arrangement whereby the bell B can control the drum I. The remainder of the apparatus is as previously described. On the axis $i$ of the drum, between the ratchet-wheel $i^2$ and the wall of the case C, is mounted in place of the lever O a pulley S, on the face of which is arranged a pawl $s$, engaging the ratchet-wheel $i^2$. This pawl is kept on the ratchet-wheel by a spring $s'$. In the upper part of the bell B is secured a cord T by a ring $b^3$, which cord passes over supporting-pulleys $t\,t$, several times around pulley S, as is shown, Fig. 7, and afterward hangs vertically downward. A weight $t'$ is attached to its end, which weight can rest on a support $t^2$. On the part of the cord between the two pulleys $t\,t$ is placed a small pulley $t^3$, to the axis of which is attached a weight $t^4$. This controlling arrangement of the drum I works as follows: When by reason of the consumption of gas the bell B descends, the pulley S turns, the pawl $s$ works on the teeth of the ratchet-wheel $i^2$, the axis $i$, as well as the drum and the band, is put in motion, and fragments of carbid fall into the water, so that gas is again generated. The bell-holder B rises; but the pawl $s$ then no longer works on the ratchet-teeth. The fall of the carbid can be made to take place at a predetermined point in the descent of the bell-holder by suitably altering the position of the support $t^2$, on which the weight $t'$ rests, this latter being raised at this moment and the cord R then acting on the pulley S.

The small weight $t^4$, suspended from the pulley $t^3$, has for its object to always maintain in a state of sufficient tension the part of the cord T wound around the pulley S, the tension being such as to prevent the entanglement of the cord.

It will be remarked that this apparatus allows a large quantity of water to be used, and consequently one not perceptibly diminishing with the progress of the reaction. In addition a constant supply of water may be obtained, and the production of gas remains regular because the water on account of its quantity does not form with the solid products of the reaction an obstructive paste or compound.

Having thus described my invention, what I claim, and desire to secure by Letters Patent, is—

1. The combination of the feed-hopper, the tray located under the hopper and having an open bottom, the traveling belt forming a movable bottom for the said tray and also forming a support and a feeding device for the carbid supplied from the hopper, a generator proper into which the carbid passes at the end of the belt, a gasometer connected with the generator and having a movable part, and a connection for operating the belt by the movement of the gasometer.

2. An acetylene-gas generator, comprising a receptacle adapted to contain water, a carbid-tray located above the receptacle, and a feed chute or channel arranged within the receptacle and adapted to dip into the water, the upper end of the feed-channel being located adjacent to the carbid-tray, and the upper and lower portions of the channel being inclined in opposite directions, forming an elbow.

3. An acetylene-gas generator, comprising a receptacle adapted to contain water, a carbid-tray located above the receptacle, a chute or channel whose upper end is located in the receptacle adjacent to the bottom of the tray, the upper portion of the channel being inclined in one direction, and the lower portion in the opposite direction, the upper part of the channel being filled with a liquid impervious to moisture, and means for feeding the carbid.

4. An acetylene-gas generator, comprising a receptacle adapted to contain water, a carbid-tray located above the receptacle, a chute or channel whose upper end is located in the receptacle adjacent to the bottom of the tray, the upper portion of the channel being inclined in one direction, and the lower portion in the opposite direction, the upper part of the channel being filled with a liquid impervious to moisture, and an auxiliary receptacle communicating with the upper end of the channel and with the top of the water-receptacle, the said moisture-proof liquid extending into the auxiliary receptacle to cut the latter off from communication with the carbid-tray.

5. An acetylene-gas generator, comprising a receptacle adapted to contain water, a carbid-tray located above the receptacle, a chute or channel for discharging the carbid from the tray into the receptacle, the tray increasing in width from both ends toward that portion of the said channel which is nearest to the feed end of the tray, and means for feeding the carbid.

6. The combination of the feed-hopper, the tray located under the hopper and having an open bottom, the traveling belt forming a movable bottom for the said tray and also forming a support and a feeding device for the carbid supplied from the hopper, rollers on which said belt is mounted, a tension-roller engaging the belt, a driving device on the shaft of one of the rollers, a generator proper into which the carbid passes at the end of the belt, a gasometer connected with the generator and having a movable part, and a connection from the moving part of the gasometer to the driving device of the belt.

In testimony whereof I have signed my name to this specification in the presence of two subscribing witnesses.

JEAN REIBEL.

Witnesses:
FREDERIC KOKO,
MATHEW PLAUDÉ.